United States Patent Office 2,811,804

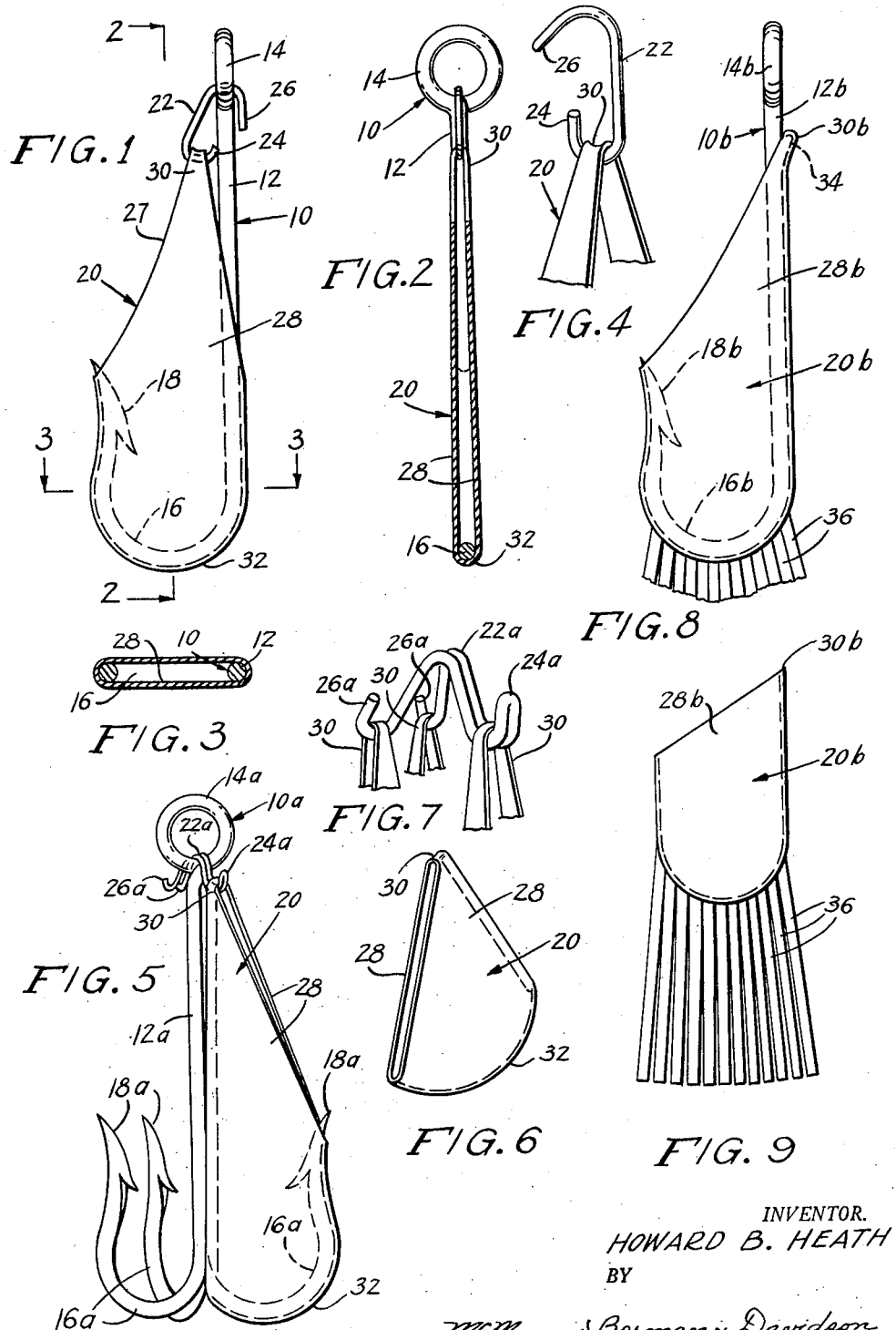

Patented Nov. 5, 1957

2,811,804
ELASTIC WEED GUARD FOR FISH HOOKS

Howard B. Heath, Bethlehem, Pa.

Application May 25, 1956, Serial No. 587,297

7 Claims. (Cl. 43—42.1)

This invention relates to a guard of elastic material, applicable to both single and multiple fish hooks (such as treble hooks) in such a manner as to prevent weeds from catching on the hook and fouling the same, while the hook is being drawn, during casting or trolling operations, through the water.

It is well known that when fish hooks are drawn through patches of weeds, said weeds tend to catch in the curve defined between the barb and the shank of the hook. This is highly undesirable, in view of the fact that the effectiveness of the lure, bait, or other fish-attracting device with which the hook is associated is seriously reduced. Further, the hook may ultimately become snagged, and in any event is not drawn through the water in a manner calculated to obtain the best results so far as attracting fish are concerned.

One important object of the present invention is to provide an elastic weed guard which will be exceedingly inexpensive, and will be applicable to wholly conventional hooks with minimum difficulty, with the guards being removable from the hooks with equal facility whenever desired.

Another object is to so design and weed guard as not to interfere in any way with the normal effectiveness of the hook when the bait or lure is taken by a fish.

Another object is to provide a weed guard as stated that will itself be adapted to attract fish, due to the adaptability of the weed guard to be made in various colors and color designs, and due to the further adaptability thereof as a support for streamer-like trailing elements.

Yet another object is to provide a weed guard as stated which, when applied to the hooks of a fish lure, will cooperate with the hooks in defining fin-like projections on the lure, thus to add to the life-like appearance of the lure.

Summarized briefly, the invention comprises a one-piece covering of a resilient material such as thin rubber, which cover is of sling-like appearance when applied to the hook, that is, the cover has a lower pocket portion adapted to receive the curved part of the hook and the greatest part of the barb of the hook, as well as the lower part of the hook shank, said pocket portion having its side walls extended and progressively reduced in width to define, at the other end of the weed guard, a relatively narrow loop portion adapted to be engaged over a suitable connector removably engaged in the eye of the fish hook.

Other objects will appear from the following description, the claims appended thereto, and from the annexed drawing, in which like reference characters designate like parts throughout the several views, and wherein:

Figure 1 is a side elevational view of a single type fish hook to which has been applied to weed guard formed according to the present invention;

Figure 2 is a longitudinal sectional view through the hook and weed guard, substantially on line 2—2 of Figure 1;

Figure 3 is a transverse sectional view through the hook and guard substantially on line 3—3 of Figure 1;

Figure 4 is a fragmentary, perspective view of the upper portion of the weed guard and its associated connector element, the hook being omitted;

Figure 5 is a view similar to Figure 1 showing a weed guard attached to one of the barb portions of a treble hook;

Figure 6 is a perspective view showing the weed guard per se in its normally contracted state;

Figure 7 is a fragmentary perspective view similar to Figure 4, showing a modified connector element or link used in engaging a plurality of the weed guards with the several portions of a treble hook;

Figure 8 is a view similar to Figure 1 showing a modified construction, a plurality of streamers being incorporated in the weed guard and being shown fragmentarily; and Figure 9 is a side elevational view of the weed guard shown in Figure 8, per se, in its normally contracted state.

Referring to the drawings in detail, and considering first the elastic weed guard shown in Figure 1, the weed guard in this instance is adapted to be positioned in protective, weed deflecting relation to a conventional single hook generally designated 10, having the usual shank 12 formed at one end with a line-attaching eye 14 and merging at its other end into an arcuate bight portion 16 terminating in a barbed tip 18.

The elastic weed guard has been generally designated by the reference numeral 20, and is formed from a single piece of resiliently stretchable material, such as thin rubber. Said piece of material is formed to include a pair of identically shaped side walls 28. In the normal, contracted condition of the weed guard shown in Figure 6, which condition would obtain whenever the weed guard is not operatively related to a hook 10, the walls 28 have upwardly converging side edges, so that the walls are progressively reduced in width toward one end of the elastic weed guard. At the smaller ends of the side walls 28, said walls are connected by a relatively narrow connecting or loop portion 30.

At their other ends, the walls have arcuately, outwardly bowed end edges, these being joined over their full length as at 32.

As a result, it may appropriately be considered that the elastic weed guard has, at its larger end, a pocket-like portion adapted to receive the curved bight portion 16 of the hook, and adapted to further receive the adjacent part of the shank 12 as well as the greatest part of the barbed tip 18. When the device is applied to the hook, said pocket-like portion is resiliently distended so as to be stretched over the tip, with the point of the barbed tip 18 projecting slightly out of the pocket. The side walls are stretched tight, lying in generally parallel planes as shown in Figure 2 at opposite sides of the general plane of the hook, and the smaller ends of the side walls are resiliently elongated to dispose the loop portion 30 over the smaller, curved end 24 of a connector link 22, the other end of which has a curved extension 26 adapted to engage in the eye 14.

It should be noted at this time that the connector link is merely one of many devices that may be employed to connect the smaller end of the weed guard to the hook, in a condition such that the weed guard will be resiliently tensioned over the hook in the manner shown in Figure 1. The particular formation and operational characteristics of the weed guard itself constitute the essence of the invention, and it will be noted that when the weed guard is tensioned over the hook in the manner shown in Figure 1, one side edge of the side walls 28 will extend substantially in a straight line from the eye 14 of the hook to the tip, providing a deflecting surface 27 that will ward off weeds as the hook is drawn through the water, so that said weeds will be prevented from entering the curved part of the hook.

In applying the weed guard to the hook, as a first step the smaller end of the same would be hooked over the smaller curved extension 24 of the connector link 22. Then, with the weed guard being stretched, the open or larger end 26 of the link is hooked into the eye 14, thus completing the operation.

As will be readily observed, the elastic weed guard, when stretched upon a fish hook, will permit the hook to be drawn through the water with considerably less chance of becoming fouled with weeds than is presently the case with unprotected hooks. The tensioned guard will deflect the weeds before they may engage in the curved part of the fish hook but at the same time, the guard does not prevent a fish from becoming hooked should he take the hook, biting into the elastic covering thereof.

Referring now to Figure 5, the guard 20 is here shown applied to a treble hook. Although one guard is shown upon the treble hook it will be understood, as may be noted from Figure 7, that three guards would ordinarily be employed, one for each of the curved portions of the hook. In this instance the hook 10a has a single shank 12a formed at one end with an eye 14a and formed at its other end with angularly spaced, outwardly projecting curved bight portions 16a respectively having at their free ends barbed tips 18a.

To facilitate the connection of the elastic weed guard in Figure 5 to a treble hook, there is shown a modified connector link 22a. This is formed from a single length of rigid wire or thin rod material, with said length of material being folded upon itself medially between its opposite ends. Adjacent the folded midlength portion of the length of material, the same is bent upwardly to provide a hook portion 24a adapted to receive one of the loops 30 of the three elastic weed guards. The end portions of the length of material are extended in diverging relation, and are formed with upwardly projecting hook-like extensions 26a receiving the other two loops 30. Between the hook-like extensions 26a and hook portion 24a, the side-by-side portions of the length of rod material are formed to substantially an inverted V-shape to receive the lower part of the eye 14a in the manner shown in Figure 5.

In this arrangement, when the elastic weed guards are all positioned over the barbed portions of the treble hook, and are engaged at their loop ends 30 with the connector link, they will cooperate to hold the connector link in proper position upon the eye 14a, with the properly positioned connector link in turn serving to properly engage and position the smaller ends of the weed guards.

In Figure 8 there is shown another modification wherein the hook 10b includes a shank 12b merging into an eye 14b and formed, at the end thereof remote from the eye, with a curved bight part 16b having a barbed tip 18b. In this form of the invention, instead of a connector link, the hook has a small barb or projection 34 formed upon the shank 12b adjacent the eye 14b.

The modified weed guard in this instance has been generally designated by the reference number 20b. It includes side walls 28b which cooperate to define a permanent pocket portion in the same manner as the side walls 28 do in the first form of the invention. The side walls 28b, further, are progressively reduced in width, above the pocket portion, in the direction of the ends of the side walls remote from the pocket portion.

The closed end of the pocket portion is rounded or curved similarly to the form shown in Figure 6, and secured to the pocket portion and trailing therefrom are closely spaced, highly flexible streamers 36, serving the function of attracting fish to the bait.

In the form shown in Figure 9, the progressive reduction of the side walls 28b in the direction of one end thereof provides a pointed portion 30b at one longitudinal edge of the elastic weed guard, and this is adapted to be stretched over the small projection 34, thus maintaining the weed guard in a properly tensioned, protective relationship to the hook 10b. Again, the tip of the barb projects slightly beyond the elastic weed guard. The heavy tension under which the weed guard is placed, in both forms of the invention, of course serves to prevent accidental enclosure of the barbed tip completely by the device.

It will be understood that the elastic guard shown in Figure 1, designated generally at 20, can be used not only on the single and treble hooks of Figures 1 and 5, but also on the hook of Figure 8.

Both of the weed guards can of course be made with skirts or streamers such as shown in Figure 9. Further, both the weed guards, as well as the skirts or streamers thereon, can be made in different colors and different color combinations, to increase the attractiveness of the device to fish, so that the device thus serves a dual function, first of protectively guarding the hook against being fouled with weeds, and second of attracting fish.

When the weed guard is properly colored, and is applied to a hook of an artificial fish lure, it cooperates with the hook in forming a fin-like protuberance on the lure, thus adding to the life-like simulation of a bait fish by the artificial lure.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. An elastic weed guard for a fish hook of the type including at least one shank and a curved bight portion terminating in a barb laterally spaced from the shank by the bight portion, said weed guard comprising a pocket-like member including a pair of resiliently stretchable, identical side walls spaced closely apart to receive the fish hook between them in contact with the opposite side surfaces of the fish hook, said side walls being formed at least at one end to a width sufficient to enclose therebetween the entire bight portion and substantially the entire barb of the fish hook, the side walls being connected together at their edges for the full length of the barb and bight enclosing portions of the side walls, for extension of the connected edges of the side walls in longitudinally contacting relation to said barb and bight portion.

2. An elastic weed guard for a fish hook of the type including at least one shank and a curved bight portion terminating in a barb laterally spaced from the shank by the bight portion, said weed guard comprising a pocket-like member including a pair of resiliently stretchable, identical side walls spaced closely apart to receive the fish hook between them in contact with the opposite side surfaces of the fish hook, said side walls being formed at least at one end to a width sufficient to enclose therebetween the entire bight portion and substantially the entire barb of the fish hooks, the side walls being connected together at their edges for the full length of the barb and bight enclosing portions of the side walls, for extension of the connected edges of the side walls in longitudinally contacting relation to said barb and bight portion, said side walls having, at said one end thereof, end edges constituting the connected edges of the side walls and arcuately curved, in the untensioned condition of the side walls, correspondingly to the curvature of said bight portion.

3. An elastic weed guard for a fish hook of the type including at least one shank and a curved bight portion terminating in a barb laterally spaced from the shank by the bight portion, said weed guard comprising a pocket-like member including a pair of resiliently stretchable, identical side walls spaced closely apart to receive the fish hook between them in contact with the opposite side surfaces of the fish hook, said side walls being formed at least at one end to a width sufficient to enclose therebetween the entire bight portion and substantially the entire barb of the fish hook, the side walls being connected together at their edges for the full length of the barb and bight enclosing portions of the side walls, for extension of the connected edges of the side walls in longitudinally contacting relation to said barb and bight portion, said side walls having, at said one end thereof, end edges constituting the connected edges of the side walls and arcuately curved, in the untensioned condition of the side walls, correspondingly to the curvature of said bight portion, said side walls being progressively reduced in width toward the other ends thereof and being connected at said other ends.

4. An elastic weed guard for a fish hook of the type including at least one shank and a curved bight portion terminating in a barb laterally spaced from the shank by the bight portion, said weed guard comprising a pocket-like member including a pair of resiliently stretchable, identical side walls spaced closely apart to receive the fish hook between them in contact with the opposite side surfaces of the fish hook, said side walls being formed at least at one end to a width sufficient to enclose therebetween the entire bight portion and substantially the entire barb of the fish hook, the side walls being connected together at their edges for the full length of the barb and bight enclosing portions of the side walls, for extension of the connected edges of the side walls in longitudinally contacting relation to said barb and bight portion, said side walls having, at said one end thereof, end edges constituting the connected edges of the side walls and arcuately curved, in the untensioned condition of the side walls, correspondingly to the curvature of said bight portion, said side walls being progressively reduced in width toward the other ends thereof and being connected at said other ends; and means adapted for connection to the fish hook and engaging said member at the connected other ends of the side walls.

5. An elastic weed guard for a fish hook of the type including at least one shank formed into an eye at one end and a curved bight portion terminating in a barb laterally spaced from the shank by the bight portion, said weed guard comprising a pocket-like member including a pair of resiliently stretchable, identical side walls spaced closely apart to receive the fish hook between them in contact with the opposite side surfaces of the fish hook, said side walls being formed at least at one end to a width sufficient to enclose therebetween the entire bight portion and substantially the entire barb of the fish hook, the side walls being connected together at their edges for the full length of the barb and bight enclosing portions of the side walls, for extension of the connected edges of the side walls in longitudinally contacting relation to said barb and bight portion, said side walls having, at said one end thereof, end edges constituting the connected edges of the side walls and arcuately curved, in the untensioned condition of the side walls, correspondingly to the curvature of said bight portion, said side walls being progressively reduced in width toward the other ends thereof and being connected at said other ends; and means adapted for connection to the fish hook and engaging said member at the connected other ends of the side walls, comprising a connector link having confronting, hook-shaped ends one of which is adapted to receive said connected other ends of the side walls, and the other of which is adapted for engagement with the eye of the fish hook.

6. An elastic weed guard for a fish hook of the type including at least one shank formed into an eye at one end and a curved bight portion terminating in a barb laterally spaced from the shank by the bight portion, said weed guard comprising a pocket-like member including a pair of resiliently stretchable, identical side walls spaced closely apart to receive the fish hook between them in contact with the opposite side surfaces of the fish hook, said side walls being formed at least at one end to a width sufficient to enclose therebetween the entire bight portion and substantially the entire barb of the fish hook, the side walls being connected together at their edges for the full length of the barb and bight enclosing portions of the side walls, for extension of the connected edges of the side walls in longitudinally contacting relation to said barb and bight portion, said side walls having, at said one end thereof, end edges constituting the connected edges of the side walls and arcuately curved, in the untensioned condition of the side walls, correspondingly to the curvature of said bight portion, said side walls being progressively reduced in width toward the other ends thereof and being connected at said other ends; and means adapted for connection to the fish hook and engaging said member at the connected other ends of the side walls, comprising a connector link having an upwardly arched intermediate portion engageable with the eye of the fish hook, said link having a plurality of upwardly turned, hook-like extensions in triangularly spaced relation, respectively adapted to receive a plurality of the weed guards at said connected other ends of the weed guards, for engagement of the weed guards over the hook portions of a treble hook.

7. An elastic weed guard for a fish hook of the type including at least one shank and a curved bight portion terminating in a barb laterally spaced from the shank by the bight portion, said weed guard comprising a pocket-like member including a pair of resiliently stretchable, identical side walls spaced closely apart to receive the fish hook between them in contact with the opposite side surfaces of the fish hook, said side walls being formed at least at one end to a width sufficient to enclose therebetween the entire bight portion and substantially the entire barb of the fish hook, the side walls being connected together at their edges for the full length of the barb and bight enclosing portions of the side walls, for extension of the connected edges of the side walls in longitudinally contacting relation to said barb and bight portion, said side walls having, at said one end thereof, end edges constituting the connected edges of the side walls and arcuately curved, in the untensioned condition of the side walls, correspondingly to the curvature of said bight portion; and a plurality of flexible streamers extending outwardly from the curved edges of said side walls.

References Cited in the file of this patent
UNITED STATES PATENTS

| | | |
|---|---|---|
| 994,927 | Jefferson | June 13, 1911 |
| 1,191,031 | Peters | July 11, 1916 |
| 1,365,111 | Lawrence | Jan. 11, 1921 |
| 2,306,181 | Neumann | Dec. 22, 1942 |
| 2,441,232 | Bakken | May 11, 1948 |